(12) United States Patent
Suetrong et al.

(10) Patent No.: US 11,098,693 B2
(45) Date of Patent: Aug. 24, 2021

(54) APPARATUS FOR CONVERTING WIND INTO CIRCULAR MECHANICAL MOTION

(71) Applicants: Nicholas Aruhn Aylor Suetrong, Garland, TX (US); Robert Benson Aylor, Cincinnati, OH (US)

(72) Inventors: Nicholas Aruhn Aylor Suetrong, Garland, TX (US); Robert Benson Aylor, Cincinnati, OH (US)

( * ) Notice: Subject to any disclaimer, the term of this patent is extended or adjusted under 35 U.S.C. 154(b) by 0 days.

(21) Appl. No.: 13/815,811

(22) Filed: Mar. 16, 2013

(65) Prior Publication Data

US 2014/0271156 A1 Sep. 18, 2014

(51) Int. Cl.
*F03D 3/06* (2006.01)
*F03D 9/25* (2016.01)
*F03D 3/00* (2006.01)

(52) U.S. Cl.
CPC ........... *F03D 3/067* (2013.01); *F03D 3/002* (2013.01); *F03D 3/005* (2013.01); *F03D 9/25* (2016.05); *F05B 2240/311* (2013.01); *Y02E 10/74* (2013.01)

(58) Field of Classification Search
CPC ........ Y02E 10/70; Y02E 10/74; Y02E 10/721
USPC .......................................... 416/132 A, 132 B
See application file for complete search history.

(56) References Cited

U.S. PATENT DOCUMENTS

| | | | | |
|---|---|---|---|---|
| 692,714 A | * | 2/1902 | Sala et al. ................ | 416/169 R |
| 2,524,500 A | * | 10/1950 | Whitehurst ......... | A63H 27/082 |
| | | | | 244/153 R |
| 4,236,504 A | * | 12/1980 | Cornelison, Jr. ......... | F03D 7/06 |
| | | | | 126/247 |
| 4,276,033 A | * | 6/1981 | Krovina ............... | B63H 9/0685 |
| | | | | 440/8 |
| 4,316,699 A | * | 2/1982 | Schott et al. ................ | 416/139 |
| 4,329,593 A | * | 5/1982 | Willmouth ..................... | 290/44 |
| 4,364,709 A | * | 12/1982 | Tornquist ................ | 416/132 B |
| 4,508,972 A | * | 4/1985 | Willmouth ............. | F03D 9/255 |
| | | | | 290/42 |
| 4,685,642 A | * | 8/1987 | Schloss ............... | A63H 27/082 |
| | | | | 244/153 A |
| 4,818,180 A | * | 4/1989 | Liu .............................. | 416/117 |
| 4,832,571 A | * | 5/1989 | Carrol ..................... | F03D 3/064 |
| | | | | 416/132 B |
| 5,083,902 A | * | 1/1992 | Rhodes ..................... | 416/132 B |
| D336,762 S | * | 6/1993 | Miller ............................ | D25/1 |

(Continued)

FOREIGN PATENT DOCUMENTS

DE    102012014627 A1 * 2/2014 ............... F03D 9/00

*Primary Examiner* — Christopher R Harmon (57) ABSTRACT

Pocket and cup sails formed from flexible materials, especially such sails formed with excess material, have spar like supports attached at their deepest point to maintain the depth of the said sails when the wind fills them so that the sails expand to maximize resistance to the wind coming into the openings of the sails and so that the sails deflate when the wind is coming from the back of the sails to minimize resistance to the wind, the said sails being attached to rotor arms on rotary devices to provide torque, the torque being used to rotate decorative structures including the sails themselves, generate electricity, bring airplane tires up to speed before landing, and/or measure wind speed, and sails optionally having cuffs on the inside to help the sails inflate and/or maintain inflation by minimizing spillage of air.

6 Claims, 3 Drawing Sheets

(56) References Cited

U.S. PATENT DOCUMENTS

| | | | | |
|---|---|---|---|---|
| 5,553,996 | A * | 9/1996 | Farrar | F03D 3/065 |
| | | | | 415/2.1 |
| 5,570,997 | A * | 11/1996 | Pratt | 416/117 |
| 5,669,758 | A * | 9/1997 | Williamson | F03D 1/04 |
| | | | | 416/4 |
| 5,823,749 | A * | 10/1998 | Green | 416/132 B |
| 5,833,174 | A * | 11/1998 | Knight | A63H 27/082 |
| | | | | 244/155 A |
| 5,997,252 | A * | 12/1999 | Miller | F03D 3/005 |
| | | | | 416/132 B |
| 6,895,812 | B2 * | 5/2005 | Dahlberg | G01P 5/06 |
| | | | | 73/170.01 |
| 7,040,858 | B2 * | 5/2006 | Suzuki | 415/4.2 |
| 7,321,173 | B2 * | 1/2008 | Mann | F03D 9/007 |
| | | | | 290/44 |
| D642,125 | S * | 7/2011 | Race | D13/115 |
| 8,201,510 | B1 * | 6/2012 | Engling | B63H 9/04 |
| | | | | 114/39.22 |
| 8,354,756 | B2 * | 1/2013 | Ellis | 290/44 |
| 2011/0272951 | A1 * | 11/2011 | Marchand | F03D 1/025 |
| | | | | 290/55 |
| 2013/0108458 | A1 * | 5/2013 | Goldstein | F03D 3/061 |
| | | | | 416/240 |
| 2013/0315732 | A1 * | 11/2013 | Sutz | F03D 11/02 |
| | | | | 416/9 |
| 2014/0008915 | A1 * | 1/2014 | Ribarov | F03D 9/002 |
| | | | | 290/55 |
| 2014/0322996 | A1 * | 10/2014 | Nakamura | F03D 11/045 |
| | | | | 440/8 |

* cited by examiner

APPARATUS FOR CONVERTING WIND INTO CIRCULAR MECHANICAL MOTION

BACKGROUND OF THE INVENTION

Field of the Invention

This invention relates to improvements in converting air movement into rotary mechanical action. The invention has utility in several areas including: creating rotating visual objects that are decorative; creating rotary motion that can be used to create electricity by rotating one or more of the elements of an electricity generator; and increasing the rotational speed of airplane wheels before they touch the ground to avoid excessive wear on the tread that occurs when the initial contact with the ground increases the speed of the wheel to match the speed of the airplane.

Description of Related Art

There have been many attempts to convert wind energy into electric energy using various configurations. It is desirable to have a rotation around a vertical axis where the device can function regardless of the direction of the wind and there are commercial devices with vertical axes.

There have been attempts to use a normal type of sail as part of a device to generate electricity.

It is believed that there has been a previous disclosure of solid cup like forms, similar to a portion of an anemometer cup, around airplane tires and wheels for the purpose of promoting rotation of the tires before landing.

There are many rotating devices used for visual purposes, including windmills that have different colored portions.

BRIEF SUMMARY OF THE INVENTION

The present invention makes use of a concept similar to that found in the typical anemometer, where four cups mounted on radial spokes at ninety degrees separation around a rotating vertical axis spin due to the difference in resistance to air by the cups' open sides and the cups' closed sides. The electricity generated by the rotation of the anemometer is measured for different wind speeds to calibrate the device so that the electricity generated by an unknown wind speed can be related to that generated by known wind speeds.

The present invention provides sails made from flexible substrates like plastic sheets and fabrics to provide flexible sail structures with large differences in wind resistance when the wind is coming from opposite sides of the structure. The sails herein are of two types. One type is a pocket-like sail (pocket sail) and the other type is a cup-like sail (cup sail). The pocket-like type of sail is formed by being attached along its edges to a rotating structure so that the rotating structure forms part of the pocket. The open edge of the pocket-like sail that forms the mouth of the pocket is attached at either end to the rotating structure and also to a structure that acts as a spar to keep the pocket-like sail partially open even when the wind is coming from the back of the pocket. The spar structure, being attached to the open edge of the pocket-like sail, also acts to at least partially keep the opening of the pocket-like sail from increasing in height at the opening when filled with wind coming from the open side of the sail. As a result, this causes the maximization of the size of the opening when the wind (air) fills the sail.

In the pocket-like sail, the spar at the opening of the sail also acts to keep the sail open when the sail is deflated by the action of wind coming from the opposite side of the opening. The pocket-like sail is attached to the structure of a wheel type of device at or near the outside rim to maximize the ability of the sail to rotate the structure. The difference in the force the wind can exert between the wind facing the opening and the wind coming from the back side of the sail is substantial.

For a cup-like sail, there typically is a center spar attached both to the center of the sail to maintain the depth of the cup-like sail and to a radial spoke (rotor arm) that attaches to an axle/axis so that the cup-like sail can provide a force to rotate the axle/axis. The outer perimeter of the cup-like sail is formed by attaching the sail to other spars which are, in turn, attached to the said radial spoke and to the edge of the sail to maintain the opening of the cup-like sail. The radial spoke can function as one of these spars as well as functioning as the rotor arm.

The center spars of the sails act to help maximize expansion of both the pocket-like sail and the cup-like sail when they are filled with wind by preventing the depth of the sail from increasing. The sails expand when filled with wind because there is excess sail material so the sails can form a larger perimeter when they are filled with wind and at least partially collapse when the wind is from the back of the sails.

In the cup-like sail the spar prevents the sail from increasing in depth, thus forcing the sail to spread and spread the excess sail material to maximize the opening. The cup-like sail is typically attached to a rotor arm or radial spoke near the outside end of the arm/spoke away from the axle/axis on which the arm/spoke is mounted to permit rotation of the structure and to maximize torque.

The sail structures are attached to various rotating structures close to, or on, the outside edge of said rotating structures. These rotating structures can be cylinder shaped, wheel shaped, or radial spokes attached to a central axis, as in an anemometer. The said sail structures herein typically have sufficient excess flexible sail material to allow the sail to billow out when the wind fills the sail to increase the wind resistance and to allow the sail to at least partially collapse when the wind comes from the other side of the sail to decrease wind resistance but not so much excess that the opening is completely closed when the sail is deflated. The opening needs to be at least partially open to make it easier for the wind to enter and expand (billow) the sail when the wind is again facing the opening of the sail.

Alternatively, for some purposes, the sail material can be one that stretches to provide the additional material only when under stress.

The sails comprising the flexible substrates are mounted on the surfaces of the cylinder and wheel shaped structures as pocket-like sails and as cup-like sails they are mounted on spars at or near the end of radial spokes extending outward from a rotating axle as in the structure for the radial spokes/anemometer.

The sails can also have open "cuffs" on the inside edges where the sails catch the wind to help minimize spillage of wind and to promote the billowing of the sails when wind enters them. The cuffs can be made adjustable with the ability to partially or completely unfold, e.g. by adjusting the optional spacers or other means used for maintaining the width of the open cuffs.

DETAILS OF THE INVENTION

Figure 1:
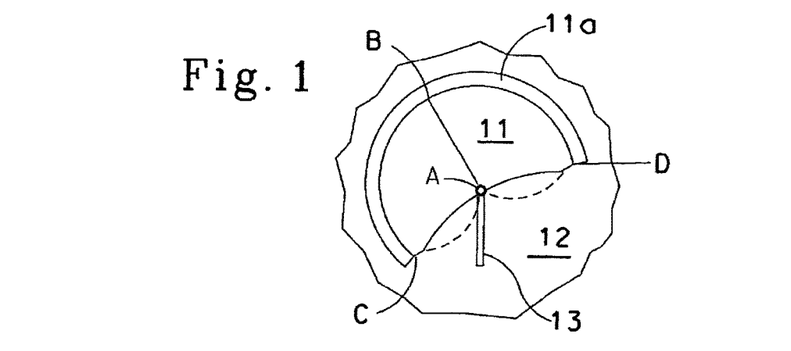
FIG. 1 is an outside partial plan view of a cup sail used to catch the wind when the wind is directed into the opening of the said cup sail, said cup sail having a central spar attached to the center of the inside of the said cup sail to prevent the said cup sail from collapsing when the wind is directed at the outside of the said cup sail.

FIG. 1 shows an embodiment of a sail in the form of a pocket-like sail 11 (sail 11 or pocket sail) comprised of a flexible substrate suitable for forming sails attached to a section of a solid wheel-like structure 12, along lines B-C and B-D, and to a spar 13 at A in the center of the open end of the pocket sail 11, said pocket sail 11 being mounted facing outward from the wheel-like structure 12 and being attached to both the wheel-like structure 12 and to the sail 11 to maintain the depth of the pocket-like sail 11 outward from the wheel-like structure 12. The said pocket-like sail is attached at its peripheral edges B-C and B-D to the solid wheel-like structure 12 using, optionally, an adhesive on a flap 11a that is part of the sail 11 that is flat against the solid wheel-like structure 12, to create the pocket-like sail 11.

The direction of the wind in FIG. 1 is into the pocket sail 11. The solid lines A-D and A-C show the edge of the pocket sail 11 in its expanded form, with the wind causing the excess material of the pocket sail 11 to billow outward to form a large opening since the spar 13 does not allow for an increase in the depth of the opening of the sail 11. The dotted lines A-C and A-D show the edge of the pocket sail 11 in its collapsed form when the wind is from the back of the pocket sail 11. The line A-B is optionally, but desirably, essentially straight to create a prow into the wind when the pocket sail 11 is collapsed/deflated.

The pocket-type sail 11 on a rotating wheel structure 12 of FIG. 1 meets the wind at its opening A-C-D. In this configuration, the wheel structure 12 is attached to the edges of the pocket sail 11 along lines B-C and B-D by, e.g., gluing a flap 11a of the sail, to define the periphery of the pocket sail 11. When the opening of the pocket sail 11 meets the wind, the excess flexible substrate that forms the sail 11 billows out to maximize resistance and when the closed edge of the sail 11 meets the wind the excess flexible substrate collapses to minimize resistance to the wind. Desirably, when the closed edge of the sail meets the wind, the center of the sail defined by line A-B does not collapse so as to maintain a prow configuration and the sail does not have enough extra material to allow it to collapse to completely fill the opening A-C-D so that there is always a hole for the wind to enter when the wind is blowing into the opening.

The difference in wind resistance caused by the pocket sail 11 when the opening is facing the wind and when the opening is not facing the wind provides a net rotational force to the wheel structure 12. The size of the opening required depends upon the radius and weight of the rotating wheel structure, the number of pocket sails and the speed of rotation desired. Typical openings for small light rotating wheel structures are only a few square inches when the sail is fully open. It is possible to maximize rotation by adding more pocket sails until the desired speed of rotation is achieved.

Figure 2:
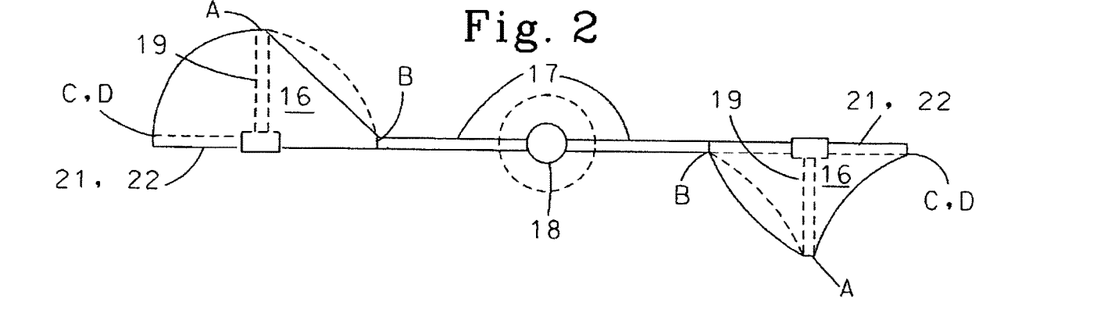
FIG. 2 is a top view of two cup shaped sails on the ends of radial spokes attached to a central rotatable axis that acts as an axle and which is perpendicular both to the ground and to the radial spokes with the wind being from the front, each sail being supported by a central spar attached to the center of the cup shaped sail to define the depth of the cup shaped sail and being supported by spars in the plane of the sail's opening that are attached to each radial spoke and to the edge of the sail to define the sail's openings, the sail on the left side being in inflated form due to the action of the wind causing the sail to billow outward and the sail on the right side being in deflated form due to the action of the wind on the back of the sail.

FIG. 2 shows a top view of two cup-like sails 16 (sail 16) with one each on the ends of radial spokes 17 which are mounted on a vertical rotatable axis/axle 18 with the wind direction from the front. The central spars 19 shown by dotted lines are inside the cup-like sails 16 and are attached to the radial spokes 17 and to the bottom of the cup-like sails 16 at A. The sails 16 are also attached to the radial spokes 17 at B. The dotted pieces 20 are round structures used to connect lateral spars 21 and 22 with 22 being behind 21 and coming out at angles from the end of the radial spoke 17. The sails 16 are attached to the ends of the lateral spars 21 and 22 at C and D respectively. The left side of FIG. 2 shows the expanded form of the cup-like sail 16 when the wind fills the sail 16, the lines B-C, B-D, and C-D being the perceived edges of the sail 16. The right side shows the collapsed form of the sail 16 when the wind is from the back of the cup-like sail 16, with the lines B-C, B-D, and C-D being the perceived edges of the sail 16. In this embodiment the line A-B is shown as an optional, but desirable, straight line by the solid line A-B. The straight line helps to form a prow like configuration on the sail 16 on the right side when that side of the sail is facing into the wind. The dotted line A-B shows the collapse of the sail when the wind is from the back of the sail 16 and the filling of the sail 16 when the wind fills the sail 16 when the line A-B is not a straight line. Lines A-C and A-D can also be straight lines. The central spar-like piece 19, which is desirably essentially perpendicular to the rotor 17, defines the depth of the cup-like sail 16 since the sail 16 is attached to the end of the spar 19, thus minimizing any increase in the depth and forcing the sail 16 to billow outward to form a larger area.

As with the pocket sails, the size of the cup-like sail opening when filled with wind that is required depends upon the length of the radius 17, the weight of the structure that is being turned, and the purpose of the structure being turned, etc. Because of the ability to add additional cup-like sails at different heights around a vertical axle, one can simply keep adding such sails until the desired torque is achieved.

Figure 3:
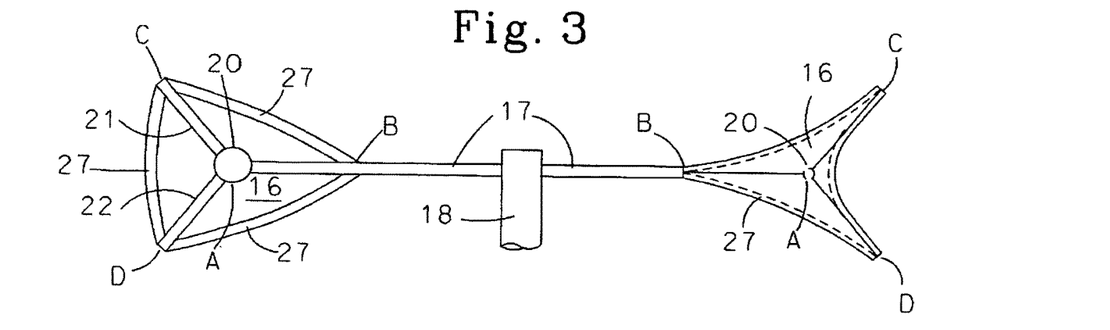
FIG. 3 shows the side view of the sails of FIG. 2 showing the spars in the plane of the sails' openings that attach to and support each of said cup shaped sails (inflated on the left and deflated on the right).

FIG. 3 shows the embodiment of FIG. 2 from the side. The spars 21 and 22 are mounted on the ends of the radial spokes 17 through the round structures 20 and are angled outward and are attached to the edges (periphery) of the cup-like sails 16 at C and D respectively to help define the openings of the cup-like sail 16. The sails 16 are also attached, as in FIG. 2 to the radial spokes 17 at B. The open view of the sails 16 on the left side of the drawing shows the sails 16 filled with wind and also shows the optional, but highly desirable cuffs 27 inside the sails 16.

Desirably, the lines A-B of the sails 16 that are moving into the wind when the sails' rotation brings them sideways into the wind on the right side of the drawing remain straight and for a prow with a relatively sharp edge when the sail deflates to minimize the resistance to the wind. The lines A-B can be made straight, or straighter, either by adding a spar, a rope, preferably in a sleeve in the sail to minimize sideways movement, or simply by stitching in an extra piece of sail substrate to strengthen the sail along that line. As noted before, the lines A-C and A-D can also be straight lines.

The cup-like sail 16 variation of FIGS. 2 and 3 is typically used with the cup-like sail 16 being attached to a radial spoke type of structure 17 that is attached to a central rotating axis/axle 18 as shown. These radial spokes 17 can be attached to the central axis/axle 18 in a variety of configurations. Typically, either two or four of the radial spokes 17 are attached to the central axis/axle 18 at the same height with two spokes 17 being directly opposite each other and, when there are four spokes at the same height, the four spokes 17 being at right angles to each other to balance the weight on the axis/axle. Desirably, there are sufficient cup-like sails 16 mounted around the axis/axle 18 at different heights to avoid having one sail 16 rob another sail 16 of wind so that at least one sail 16 is at least partially filled with wind. Typically, this means that the sails 16 should be about 45 degrees from each other around the axis/axle.

When the axis/axle 18 rotates due to the action of the wind the cup-like sails 16 are alternately pushed by the wind on their open side and then moved into the wind first with the edge (prow edge A-B) and then with the closed side which partially collapses to minimize resistance.

In the initial portion of the return journey to the position where the open side is again pushed by the wind, the edge of the cup sail that is closest to the axis moves directly into the wind and for this portion of the return journey it is desirable to have the prow configuration which results from having lines A-B relatively straight while the sail collapses on either side of the said lines A-B (and optionally A-C and A-D).

When the wind meets the open side of the cup sails 16, the excess flexible substrate allows the cup-like sails 16 to billow to maximize their cross section and thus resistance. When the wind meets the closed side of the cup-like sails 16 the excess flexible substrate collapses to allow the cup sails 16 to partially collapse to minimize the cross section and thus resistance.

Figure 4:
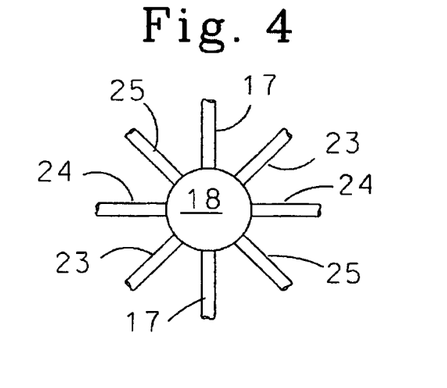
FIG. 4 is a sectional top view along the line 1-1 in FIG. 2 showing only the attachment to a vertical axle of the ends of four sets of two rotor arms (spokes) for supporting sails as in FIG. 2 attached to a vertical axis acting as an axle, each set of two rotor arms or spokes being placed 45 degrees clockwise from the preceding set as they descend the said axle.
Figure 5:
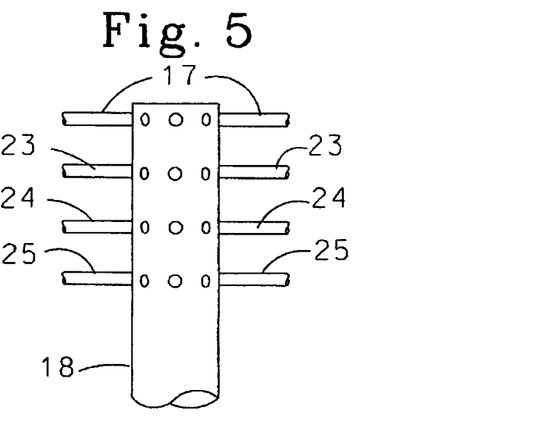
FIG. 5 is an elevation view corresponding to FIG. 4 showing only the vertical placement of the partial sections of the rotor arms/spokes along the said vertical axis/axle.

FIGS. 4 and 5 show top and side views respectively of the attachment portions (within the dotted line around the axle in FIG. 2) of the radial spokes used to form a representative structure according to the invention using multiple structures like those shown in FIG. 2 which shows only the portion of the radial spokes 17 that are attached to the axis 18 (without the sails portion for convenience of presentation). FIG. 4 is the top view of the structure with a set of two spokes 17 attached to the axis/axle 18 and three other sets of spokes 23, 24, and 25 respectively attached to the axis/axle 18 at different elevations with each lower set of spokes 23, 24, and 25 being advanced clockwise around the axis/axle 18 by 45 degrees from the preceding higher set. E.g., both spokes having the numbers 17, 23, 24, and 25 are all attached at the same height above ground for each number. Other numbers of sets can be used. For example, with six sets of sails 16 each lower set would advance 30 degrees around the axle clockwise.

FIG. 5 shows only the height of each set of two spokes, the orientation of the spokes around the axle being the same as in FIG. 4. The circles on the axle 18 from left to right would be the approximate site of the attachment of spokes 23, 17, and 25 respectively at the appropriate height. This configuration allows for each set of spokes 17, 23, 24, and 25 to engage the wind sequentially at different times and minimizes the blockage of the wind by one sail 16 of the wind that is pushing on another sail 16 at a different height off the ground. It is also possible, by slanting the openings of the sails 16 to allow the wind spilling out of one sail 16 to add to the impact of the wind on a higher, or lower, sail 16. This sequence of sails 16 can be repeated up or down the axis 18, thereby creating a nearly continuous push of the wind against at least one sail 16 at any time while increasing the number of sails 16 that can be deployed.

The number of sails can be quite large. Using many sails 16 allows one to provide a large amount of torque without having to have very long rotors, which minimizes the strength and/or weight of each rotor. It is an advantage of this approach that the radial spokes such as 17, 23, 24, and 25 can be short thus minimizing the stress on each spoke while increasing the total force available to rotate the axis/axle 18.

Figures 6, 7, 8:
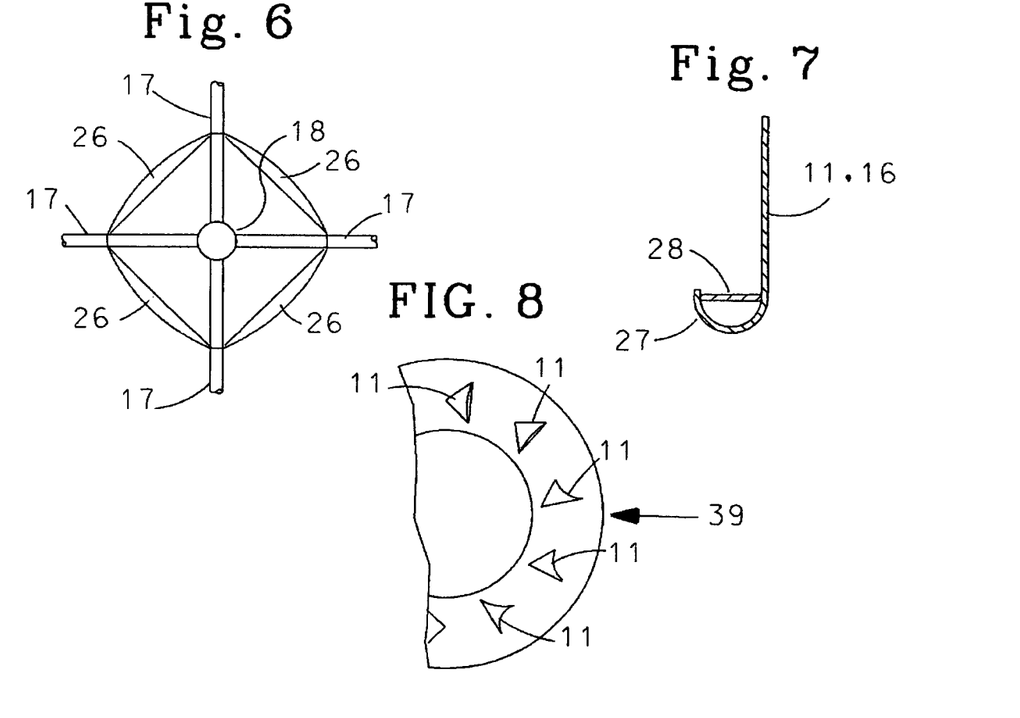
FIG. 6 is a sectional top view of a preferred configuration of two sets of sails as in FIG. 2 with each set of two rotors and cup-like sails being perpendicular to the other set to provide four rotors/spokes at 90 degrees from each other around the axle, the spokes being connected by braces that act to partially spread the strain on the spokes that are perpendicular to the wind to one of more of the spokes that are aligned with the wind.
FIG. 7 is a sectional cross section of the edge of a sail with a cuff that is placed inside the edge of the sail's opening and an optional spacer piece, used when needed to maintain the cuff's three dimensional structure, between the cuff and the main part of the sail the said cuff acting to minimize spillage of air out of the sail and thus promote and/or maintain billowing of the sail.
FIG. 8 is a partial view of a tire for use on an airplane with the sails attached to the side of the tire near its tread to provide motion in a clockwise direction from that side of the tire to help the wheel match the ground speed of the airplane before the wheels touch the ground.

FIG. 6 shows a sectional view similar to that in FIG. 4 with four spokes 17 at the same elevation, each spoke 17 being 90 degrees from the spokes 17 on either side and having the optional, but desirable, brace members 26 between the spokes so that each spoke 17 supports the other spokes. Any spoke 17 that is being exposed to a bending force is supported, through the support members 26, by one or more of the other spokes 17 that are not so exposed to a bending force at that time. This is especially important for longer spokes 17 which can be very desirable where the structure is used to generate electricity and/or where the wind is very strong.

This four spoke configuration can be used to make an anemometer. However, it is desirable to have more spokes so that one sail 16 is always substantially pushed by the wind.

The use of sail material allows for making a lighter, cheaper anemometer that can be collapsed for storage and/or transport.

The brace members 26 can be solid or flexible. The straight lines in the drawing represent the solid braces 26 and the curved lines represent that flexible braces 26, but the flexible braces would also be straight lines normally. Flexible members can only resist elongation while solid members can resist both compression and elongation, but the flexible members can be lighter. The spokes 17 that are fully exposed to the wind along their length can gain strength trough the braces from the adjacent spoke or spokes 17. With flexible brace members 26, only the front spoke 17 can provide help by resisting elongation as the wind tries to bend the side spoke backward. This is countered partially by the fact that both of the spokes 17 on either side are trying to pull the front spoke 17 and these two forces partially cancel each other.

FIG. 7 shows the edge of a pocket-like sail 11 and/or a cup-like sail 16 with an internal cuff 27 as shown in FIG. 3 on the side of the sail catching the wind and an optional spacer 28 to maintain the cuffs in expanded form. This cuff 27 helps prevent the wind (air) entering the sails from escaping (spilling) out the edge thus promoting the billowing effect of the sails. The internal edge of the cuff 27 can also be maintained in open form by attaching the edge of the cuff to one or more lines running from the spars (13, 21, 22) and/or radial spoke 17 to the edge of the cuffs on the sails (11,16) between C-D, B-C, B-D to maintain the cuffs in expanded form.

FIG. 8 shows a portion of a tire 39 for an airplane with pocket sails 11 to provide torque for turning the tire 39 when the wheels on the airplane are lowered for landing so that the tire 39 is moving closer to the speed it will require when the airplane lands. In this Figure, the airplane is landing to the left of the page so the pocket sails 11 are open to the wind at that side when at the bottom of the tire. This diminishes the wear on the tire when the tire touches the ground by minimizing the force applied by the ground to achieve the rotation of the tire needed to match the ground speed of the airplane.

Figures 9, 10:
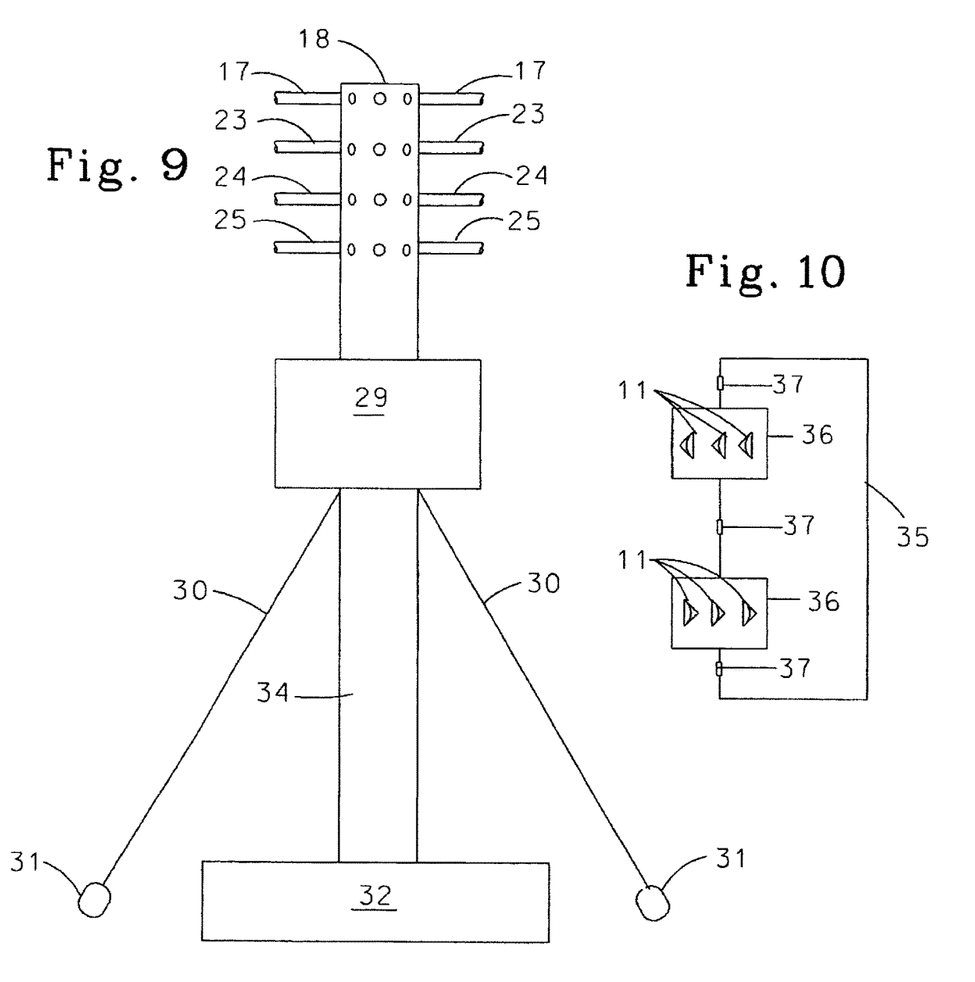
FIG. 9 is a side view of a device for creating electricity comprising a set of cup-like sails on rotors attached to a central axis which is attached to the rotor of an electrical generator which is mounted on a structure, e.g., a pipe, that is mounted on a base and stabilized by guy wires which typically are tightened using turnbuckles.
FIG. 10 is a side view of an ornamental device with a top section with sails attached to provide clockwise motion and the bottom section having sails attached to provide counterclockwise motion.

FIG. 9 shows a desirable optional way of erecting an electrical generating device comprising pairs of cup-like sails 16 as in FIGS. 2 and 3 with the configuration of the pairs of sails as shown in FIGS. 4 and 5 (without the remainder of the rotors and the sails being shown and the positions of the rotor ends being used as in FIG. 5 only for the purpose of showing the heights of the pairs of the sails, the orientation around the axis being that shown in FIG. 4), the axis 18 being attached to the rotor of a conventional electrical generator 29, the stator of the electrical generator 29 being mounted on a support 34. The support 34 can optionally be a pipe, either a single pipe or sections that are connected to form a single structure. The structure is stabilized by at least three guy wires 30 evenly spaced around the structure, the guy wires 30 being attached on the ground with optional means 31 for storing the guy wires by winding them around spools, e.g., with a windlass typically having a ratchet to maintain position, and extending or taking up excess guy wire 30 when the device is raised or lowered and the guy wires 30 optionally being fitted with turnbuckles (not shown) for additional tightening.

The structure also comprises a base 32. This simple structure for elevating the device is helpful in minimizing the cost of erecting a support for the device and in allowing easy access to the generator and sail set for repairs, inspection, etc. since the single support structure 34 can be fitted with a pivot (not shown) either in the middle or at its base to permit rotating the structure 34 to lower the top portion to a height where repairs can be made.

FIG. 10 shows an example of an ornamental device. In this embodiment, the support structure 35 holds two cylindrical shapes 36 with pocket-sails 11 on their surfaces. The upper cylindrical shape 36 has pocket-like sails 11 distributed around its outside to provide clockwise motion as viewed from above and the lower cylindrical surface has pocket-like sails 11 distributed around its surface to provide counterclockwise motion as viewed from above. The upper cylindrical surface is attached to the support structure 35 and the lower cylindrical surface by swivels 37. The lower cylindrical surface is also optionally attached to the support structure 35 at its bottom by a swivel 37.

The cylindrical surfaces 36 are desirably artistically decorated. The cylindrical surfaces 36 rotate in the wind to provide a constantly changing scene.

Although not shown, the cup-like sails can also be made decorative by using color and/or designs on the sails and/or structures supporting the sails.

In a trial of the invention, a cup-like sail 16 was fabricated with wooden dowels being used to form spoke 17 and spars 19, 21, and 22, the spar 19 being about 11 inches long and the spars 21 and 22 each being about 12 inches long and being spaced about 90 degrees from each other. Spars 19, 21 and 22 were attached to spoke 17 using a round wooden circle, the spoke 17 being inserted into a hole drilled in said wooden circle and the said spars 19, 21, and 22 being inserted into holes drilled in the said wooden circle. Cloth was used to form the cup-like sail 16 and attached to the spars using double sided tape. The edge of the sail 16 farthest from the axis 16 had an internal cuff of about 2 inches. There was sufficient cloth so that when the wind filled the sail 16, the distance from the end of the spoke 17 to the edge of the sail 16 farthest from the axis 18 to the end of the spoke 17 was about 10 inches and when the sail was deflated the distance was about 4 inches. The side edges of the sail 16 were about 8 inches from the spoke 17 when the wind filled the sail 16 and were about 2 inches from the spoke 17 when the sail 16 was deflated. The distances from the center of said wooden circle to the points of attachment of the sail to the spoke 17 and the ends of the spars 21 and 22 were each about 12 inches.

The sail 16 was exposed to the wind from a fan first on the open side and then on the closed side. The force on the sail 16 when it was exposed on the open side was found to be about one quarter of a pound measured using a postage scale and the force on the sail 16 when the closed side was exposed was not measurable with the said postage scale, but was less than about one ounce.

Each of the sails 11 and 16 can be fabricated using flexible substrates as discussed hereinafter.

The radial spokes 17 and spars 13, 19, etc. can be solid bars, tubes, etc.

SPECIFIC EMBODIMENTS

Decorative Structures

The rotating structures can be used to provide visual interest for decorative purposes as shown in FIG. 9. Such structures are similar to, but more interesting than, the common pinwheels seen on many lawns. Examples of such lawn ornaments are found in U.S. Pat. No. 5,092,809, Kessler et al., issued Mar. 3, 1992 and U.S. Pat. No. 6,789,911, Nelson et al., issued Sep. 14, 2004, said patents being incorporated herein by reference.

The structures can include cylinders with the pocket type of sail structures attached around the cylinders to create motion when the wind blows and the cup-like sails which are either decorated or which are used to move decorative structures around when the wind blows. Since the structures can have the sails oriented either to provide clockwise or counter clockwise rotation, the structures can be "stacked" as shown in FIG. 9, on top of each other to provide additional visual interest with one structure in the stack rotating opposite to the adjacent structure to provide, e.g., a kaleidoscope effect or to create constantly changing patterns. In all instances, the structures are mounted on a vertical rotatable axis or axle (said terms being used interchangeably to indicate that the structures can revolve around the axis), or hung on swivels, and when there are both clockwise and counterclockwise rotating structures, they can be hung one on top of the other with swivels between them.

For decorative structures, one can use either the cup-like sails mounted on radial spokes with the sails bearing decorative figures or having different colors, etc. The pocket-like sails can be attached to cylinders rotating around a central axis with the cylinders bearing decorative figures. Both the cup-like sail embodiments and/or the pocket-like sail embodiments can be mounted above and/or below each other and can have either clockwise and/or counterclockwise rotation.

Electricity Generation

The use and the advantages of vertical rotating structures to generate electricity are known. U.S. Pat. No. 8,087,894, Brookes, issued Jan. 3, 2012; U.S. Pat. No. 7,984,110, Morgan et al., issued May 25, 2011; and U.S. Pat. No. 7,083,382, Ursus, issued Aug. 1, 2006 disclose various ways of creating such structures, said patents being incorporated herein by reference to supplement the disclosure of how to attach such structures to electricity generators, support structures, etc.

The rotating structures can be used to create electrical energy by attaching the vertical rotating axis to the rotor portion of an electricity generator as shown in FIG. 8. It is also possible to use both clockwise and counter clockwise rotating structures, with one rotating structure being attached to the rotor and the other to the stator portion of the generator. The rotating structures having the clockwise and counterclockwise rotations are mounted above and below the generator. In these uses, the rotating structures serve the same purpose as the common propellers seen in many locations, i.e., they act to rotate the rotor and/or stator of an electric generator to provide electricity. The rotating structures of this invention can be manufactured with lighter and/or much less costly materials and are ideally adapted to use for providing electricity for individual houses, farms, business establishments, etc.

For example, the ability of the rotating structure to operate with the wind coming from any direction allows it to be mounted on a simple pole structure (e.g., a pipe that is optionally comprised of sections 34), either directly under and/or over an electricity generator 29. The use of guy wires 30 (steel rope or Kevlar rope) positioned around the pole allows one to minimize the lateral strength needed in the pole. A single pole is less likely to be damaged by wind and optionally can be in the form of pipe sections fabricated in shorter lengths which allows for various heights and/or repair of only a damaged portion of the structure.

These smaller generators are highly desirable for use either alone or for creating electricity grids of a size to allow homes and farms that are isolated from normal electric grids or which are vulnerable to loss of electric service to maintain electricity availability. These smaller generators can be tied into back-up systems that are more likely to survive major catastrophes.

The rotating structure with a generator as in FIG. 8 can also be suspended under a balloon instead of being mounted on a pole. Again, guy wires attached to a solid structure below the balloon or to the balloon itself allows one to keep the balloon in place and prevent rotation of the balloon. When used with a balloon, it is also possible to use both clockwise and counter clockwise rotating structures for the rotor and stator respectively. For generation of electricity, e.g., one clockwise rotating structure can be attached to the rotor above the generator and a counterclockwise rotating structure can be attached to the stator below the generator to minimize the tendency of the rotating structures to try to turn the generator. The balloon suspension can allow one to lower the balloon when bad weather threatens or to make repairs and/or re-inflate the balloon. The rotating structures can also be used for visual purposes, where the rotating structures are suspended to display visual items including advertising at higher altitudes than ordinary advertising signs.

If a small tube is provided from the ground to the balloon, the balloon's inflation can be maintained without lowering the balloon. The balloons are typically inflated with either helium of hydrogen. If the balloon is inflated with hydrogen and the balloon is used to suspend an electricity generator, any excess electricity that is generated can be used to break water down into hydrogen and oxygen by electrolysis and the hydrogen can then be used to keep the balloon inflated. U.S. Patent Applications: 2008/0231053, Burtch, filed Sep. 25, 2008 and 2005/0121917, filed Jun. 9, 2005 disclose using electricity generated by wind to create hydrogen and store it for use, said applications being incorporated by reference to support the disclosure herein.

Airplane Tires

Another very valuable use of the pocket-like sails 11 is on the sidewalls of airplane tires as shown in FIG. 8. Such tires are typically retracted during flight to minimize drag. The pocket-like sails 11 start the tires rotating when the tires are lowered for landing. The wear caused by the initial contact of the tires with the ground is thus minimized.

Anemometer

Yet another use is to make an anemometer using one or more sets of four of the cup-like sails 16 on rotors 17 that are at 90 degrees from each other as in FIG. 6, or using four or more sets of two sails 16 at optionally 45 degrees from each other as in FIGS. 4 and 5, around a vertical axis. The device can be attached to a small electric generator and tested in different wind speeds to calibrate the anemometer.

Materials

The sail materials herein can be selected from a wide variety of available materials such as: sheet plastic-like Mylar; woven fabrics like those made from canvas or Mylar sail material; non-woven fabrics; knitted fabrics from, e.g., Kevlar; etc. For heavy duty, the stronger materials like Mylar and Kevlar are highly desirable. Use of light weight synthetic materials allows one to create structures that can withstand large wind forces without the structures having excess weight. Nylon, polyester, Kevlar, Mylar, and carbon fiber have been popular materials. Each has strengths and weaknesses. Kevlar and carbon fiber have great strength and carbon fiber has high resistance to UV damage. Mylar is used in many high quality sails. For situations that do not produce high stress, less costly materials like Nylon and polyester are quite suitable. Cotton and other cellulosic fibers are also useful, especially for ornamental use. Elastic sails which can be formed by incorporating spandex can allow for spreading of the sail without using excess material under high wind conditions.

For cables, steel is strong, but Kevlar ropes such as those sold by U.S. Robe & Cable, 1514 Veshecco Drive, Erie, Pa. 16501 are comparable in strength and weigh less. For a ¼" size, the steel has a breaking point of about 5450 lbs and the 12 strand Kevlar rope has a strength of about 6,600 lbs. The steel, when used as a guy wire will attract and conduct lightning to the ground. This may not be desirable. The lighter ropes are desirable for handling, especially for lowering the rotating structure, e.g., for repair or to prevent damage from very high winds.

The solid structures herein can be fabricated from a variety of materials including bamboo, wood, iron, steel, aircraft aluminum, etc. The axles can be solid or tubular and can be fabricated from the same kinds of material.

What is claimed is:

1. A cup-like sail structure attached to a radial spoke that is mounted on a vertical rotatable axis, said cup-like sail's opening, which is the edge of said cup-like sail, being in a vertical plane and said cup-like sail structure having one or more spars that are attached at or near the end of said radial spoke to help support said sail, said cup-like sail being attached at its edge to either said radial spoke and at least one of said spars, or to more than one of said spars, there being at least three separate attachment points at the edge of the sail, to define the vertical plane opening of said cup-like sail, and also having a separate spar going out from said radial spoke to where it is attached at the center of said cup-like sail to maintain the depth of the said cup-like sail.

2. The cup-like sail structure of claim 1 wherein there is excess flexible substrate between at least two adjoining attachment points to allow for the said cup-like sail to billow when filled with wind and to collapse when the wind is at the back of the said cup-like sail and wherein said excess flexible substrate has an inner open cuff to impede air from spilling from the sail.

3. The cup-like sail structure of claim 2 wherein said inner open cuff comprises one or more spacers to maintain an opening in said cuff to promote billowing of the sail.

4. The cup-like sail structure of claim 1 wherein said flexible substrate of said cup-like sail maintains a straight line from the center of the said cup-like sail to at least one of said attachment points at the edge of said sail while the sail around the said straight line collapses to act as a prow when the back of the sail is moving into the wind.

5. The cup-like structure of claim 4 wherein there is at least one rope or spar on the inside of said cup-like sail along said straight line from the center of the said cup-like sail to said attachment point to help said line remain straight so as to act as a prow.

6. A structure for converting wind energy into mechanical energy containing at least two of the said cup-like sail structures of claim 1 which are mounted in pairs where each of said cup-like sail of each of said pairs is attached on the opposite side of said vertical rotatable axis from the other member of said pair, all of said cup-like sails sharing the same clockwise or counter clockwise orientation with respect to said rotatable axis, and all of said cup-like sail structures being evenly spaced around said rotatable axis to create a balanced structure.

* * * * *